United States Patent
Isola et al.

(10) Patent No.: US 10,567,433 B2
(45) Date of Patent: *Feb. 18, 2020

(54) NETWORK DEVICE AUTHORIZATION FOR ACCESS CONTROL AND INFORMATION SECURITY

(71) Applicant: BANK OF AMERICA CORPORATION, Charlotte, NC (US)

(72) Inventors: Rahul Isola, Charlotte, NC (US); Anthony P. Grossi, Chicago, IL (US)

(73) Assignee: Bank of America Corporation, Charlotte, NC (US)

(*) Notice: Subject to any disclaimer, the term of this patent is extended or adjusted under 35 U.S.C. 154(b) by 174 days.

This patent is subject to a terminal disclaimer.

(21) Appl. No.: 15/642,983

(22) Filed: Jul. 6, 2017

(65) Prior Publication Data
US 2019/0014150 A1    Jan. 10, 2019

(51) Int. Cl.
| | |
|---|---|
| *H04L 12/26* | (2006.01) |
| *H04L 12/22* | (2006.01) |
| *H04L 29/06* | (2006.01) |
| *H04W 12/08* | (2009.01) |
| *G06F 21/55* | (2013.01) |

(52) U.S. Cl.
CPC ........ *H04L 63/162* (2013.01); *H04L 63/0236* (2013.01); *H04L 63/101* (2013.01); *H04L 63/14* (2013.01); *H04W 12/08* (2013.01); *H04L 63/0876* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 7,516,487 B1 | 4/2009 | Szeto et al. | |
| 7,523,485 B1 | 4/2009 | Kwan | |
| 7,562,390 B1 | 7/2009 | Kwan | |
| 7,735,114 B2 | 6/2010 | Kwan et al. | |
| 8,238,352 B2 * | 8/2012 | Shim | H04L 63/101 370/401 |
| 8,239,929 B2 | 8/2012 | Kwan et al. | |
| 8,380,828 B1 * | 2/2013 | Schlichter | H04L 63/0227 709/221 |

(Continued)

OTHER PUBLICATIONS

An Anomaly Traffic Detection Method Based on the Flow Template for the Controlled Network. Wang et al. iCOCN. (Year: 2016).*

(Continued)

*Primary Examiner* — Venkat Perungavoor
(74) *Attorney, Agent, or Firm* — Michael A. Springs (57) ABSTRACT

A system that includes a switch, a network authentication server (NAS), and a threat management server. The NAS sends a device identifier for an endpoint device and a port identifier identifying a port on the switch to a threat management server in response to the device passing authentication. The threat management server determines the endpoint device is present in the black list using the device identifier. The threat management server determines the endpoint device has a block on the port of the switch using the port identifier. The threat management server removes the block for the endpoint device on the port on the switch in response to determining the endpoint device has the block on the port of the switch.

20 Claims, 4 Drawing Sheets

(56) References Cited

U.S. PATENT DOCUMENTS

| | | | |
|---|---|---|---|
| 8,447,865 B2 | 5/2013 | Bansal et al. | |
| 8,453,227 B2 | 5/2013 | Aiello et al. | |
| 8,533,227 B2 | 9/2013 | Schneider | |
| 8,938,782 B2 | 1/2015 | Sawhney et al. | |
| 8,949,827 B2 | 2/2015 | Becker et al. | |
| 8,984,504 B2 | 3/2015 | Becker et al. | |
| 9,553,891 B1 | 1/2017 | Isola et al. | |
| 2002/0032797 A1* | 3/2002 | Xu | H04L 29/06 709/238 |
| 2002/0083175 A1* | 6/2002 | Afek | H04L 63/1416 709/225 |
| 2006/0174342 A1* | 8/2006 | Zaheer | G06F 21/56 726/23 |
| 2007/0156900 A1* | 7/2007 | Chien | G06F 21/645 709/225 |
| 2008/0092223 A1* | 4/2008 | Setia | H04L 63/0227 726/11 |
| 2008/0263666 A1* | 10/2008 | Keohane | H04L 63/126 726/23 |
| 2011/0010769 A1* | 1/2011 | Jarredal | H04L 63/0236 726/13 |
| 2011/0274110 A1* | 11/2011 | Mmmadi | H04L 49/30 370/392 |
| 2013/0182721 A1* | 7/2013 | Zhang | H04L 45/02 370/475 |
| 2015/0121449 A1* | 4/2015 | Cp | H04L 63/145 726/1 |
| 2015/0229609 A1* | 8/2015 | Chien | H04L 63/101 726/13 |
| 2015/0249666 A1* | 9/2015 | Kato | H04L 63/08 726/7 |
| 2016/0366159 A1* | 12/2016 | Chiba | G06F 21/55 |
| 2017/0237769 A1* | 8/2017 | Ookawa | H04L 45/26 726/22 |
| 2017/0264592 A1* | 9/2017 | Yoda | H04L 45/745 |
| 2017/0272465 A1* | 9/2017 | Steele | H04L 63/101 |
| 2017/0318040 A1* | 11/2017 | Wang | H04L 43/0876 |
| 2017/0339106 A1* | 11/2017 | Rimmer | H04L 12/6418 |
| 2018/0145986 A1* | 5/2018 | Chien | H04L 63/101 |

OTHER PUBLICATIONS

Isola, R. et al., "Network Device Access Control and Information Security," U.S. Appl. No. 15/643,175, filed Jul. 6, 2017, 38 pages.

* cited by examiner

NETWORK DEVICE AUTHORIZATION FOR ACCESS CONTROL AND INFORMATION SECURITY

TECHNICAL FIELD

The present disclosure relates generally to information security, and more specifically to network access control.

BACKGROUND

Many enterprises have expansive networks that include a large number of network devices. These network environments allow data to be shared among the different network devices. One of the technical challenges that occurs in a network environment is controlling data leakage and unauthorized access to data. For example, a bad actor (e.g. a hacker) may connect a network device to a network to extract data and/or to perform other malicious activities.

Once identified, malicious devices may be blocked from accessing the network. In some instances, trusted devices may also be blocked from the network due to hardware or configuration issues. For example, a device with a configuration issue may be unable to pass authentication with a network authentication server and may be blocked from accessing the network. Reconnecting devices to a network poses several technical challenges. For instance, a bad actor may try to reconnect a malicious device to a port on a switch to reconnect the malicious device to the network. Conventional systems are unable to distinguish between malicious devices and trusted devices attempting to reconnect to the network. Conventional systems are only able to either allow all devices, including malicious devices, to reconnect the network or to block all devices from reconnecting to the network.

Without the ability to control data access and which devices are connected to the system, the system is vulnerable to having sensitive data leave the network and/or allowing malicious data (e.g. viruses and spyware) to enter the network. Thus, it is desirable to provide a solution that provides the ability to control and monitor data access and which devices are connected to a network.

SUMMARY

One of the technical challenges that occurs in a computer technology, such as a network environment, is controlling data leakage and unauthorized access to data. For example, a bad actor may connect an unauthorized network device to a network to extract data and/or to perform other malicious activities. Once identified, malicious devices may be blocked from accessing the network. Trusted devices may also be blocked from the network due to hardware or configuration issues. Reconnecting devices to a network also poses several technical challenges. For instance, a bad actor may try to reconnect a malicious device to a port on a switch to reconnect the malicious device to the network. Conventional systems are unable to distinguish between malicious devices and trusted devices attempting to reconnect to the network. Conventional systems are only able to either allow all devices, including malicious devices, to reconnect the network or to block all devices from reconnecting to the network.

In contrast to conventional systems, the system described in the present application provides a technical solution that enables the system to distinguish between malicious devices and trusted devices which allows trusted devices to reconnect to the network while preventing malicious devices from reconnecting to the network. The ability control access to the network improves the operation of the system and the security of the network. For example, the system is able to allow trusted devices to reconnect to the network while protecting the network from malicious devices. Malicious devices are unable to reconnect to the system to perform any malicious activities such as data exfiltration. Thus, the system provides an unconventional technical solution that allows the system to protect itself and the network from attacks by malicious devices.

In one embodiment, the system detects a device that has been previously blocked from network is attempting to reconnect to the network. The device may have previously been blocked from one or more ports on a switch in the network. The system determines whether or not to reconnect the device to the network based on its ability to authenticate itself. The system is configured to prevent devices that are unable to pass authentication from reconnecting to the network. The system is also configured to allow devices that are able to pass authentication to reconnect to the network. The system provides a technical advantage by allowing trusted devices to reconnect to the network while preventing untrusted devices from accessing the network. This process allows the system to protect itself from untrusted devices attempting to reconnect to the network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
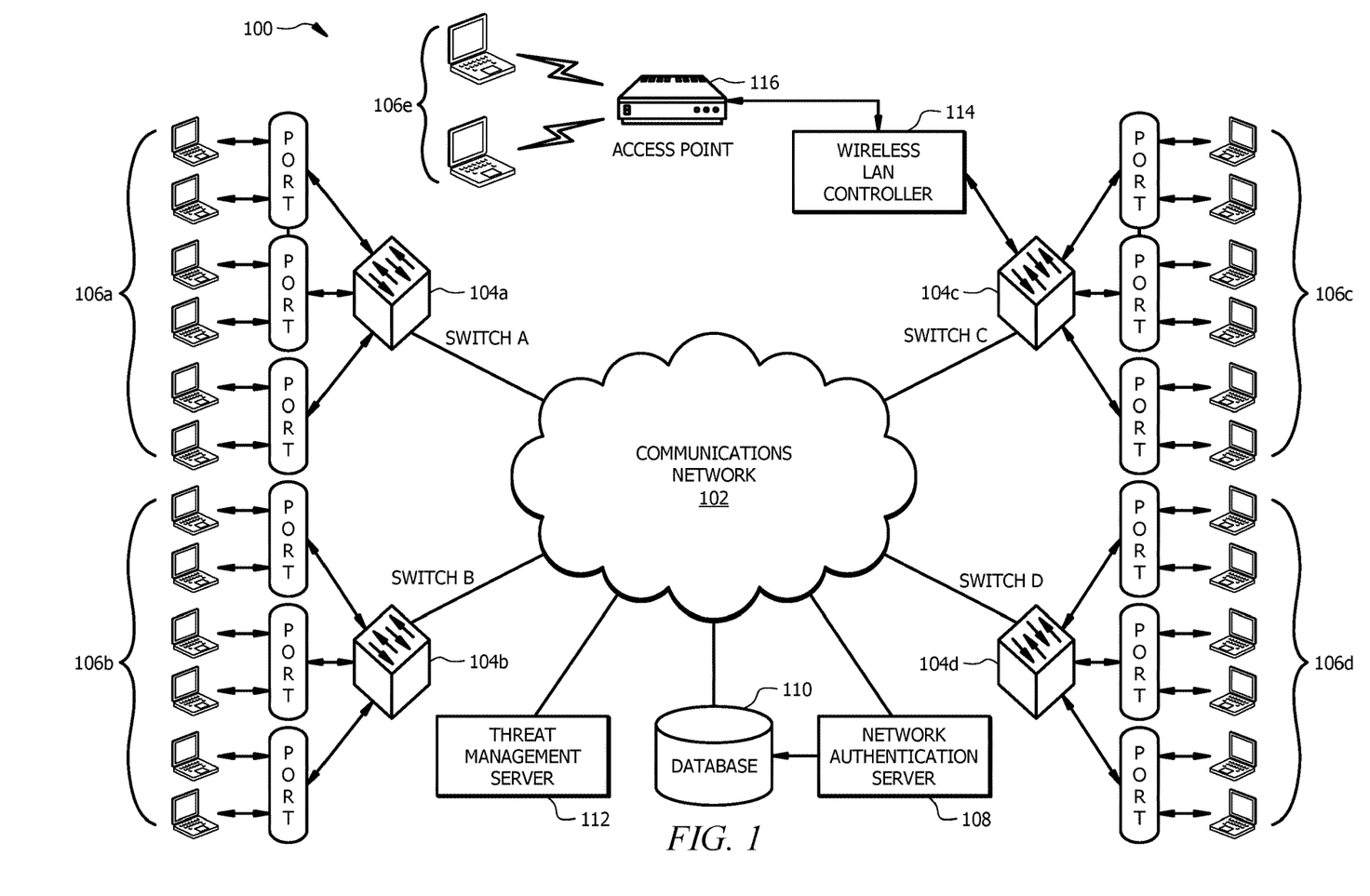
FIG. 1 is a schematic diagram of an embodiment of a system configured to implement network access control.

FIG. 1 is a schematic diagram of an embodiment of a system 100 configured to implement network access control. System 100 is generally configured to support a number of different operations, including but not limited to, identifying unknown or undesirable devices (e.g., non-compliant, rogue, or malicious devices), determining the location of the undesirable devices, collecting information from a switch connected to the undesirable devices, and blocking the undesirable devices from being able to access the network and/or isolate the undesirable in a safe zone within the network. For example, the system 100 is configured to detect when a bad actor connects a malicious device to port on a switch. The system 100 is configured to identify the malicious device and to block the malicious device from accessing the network. In other examples, the system 100 is configured to isolate and monitor malicious devices. Isolating and monitoring malicious devices allows the system 100 to collect information about malicious devices, which may be later used to further improve the security of the system 100.

The system 100 is further configured to reconnect endpoint devices that have been previously blocked from the network after the endpoint devices pass authentication. Malicious or untrusted devices are unable to pass authentication once they have been blocked from the network and will remained blocked from the network. An endpoint device that is blocked from the network due to an issue will be able to reconnect to the network once the issue is resolved and the endpoint device is able to authenticate itself. Examples of the system 100 reconnecting endpoint devices are described in FIGS. 3 and 4.

In some embodiments, the system 100 is configured to authenticate a user, to determine disconnection capabilities of switches coupled to undesirable devices, to facilitate disconnecting undesirable devices, and to monitor the network for subsequent connection attempts by the undesirable devices to reconnect to the network. For example, the system 100 is configured to identify malicious devices that are attempting to connect to the network and to block the malicious devices from accessing the network. Detecting, removing, and blocking malicious devices from the network allow the system 100 to enhance network security by providing improved data access control. In some embodiments, these tasks may be performed by a particular device, such as a threat management server 112. In other implementations, these tasks may be performed in a distributed fashion using various components that interact with each other over a network.

System 100 comprises switches 104, endpoint devices 106, a network authentication server (NAS) 108, a database 110, a threat management server 112, a wireless LAN controller 114, and an access point 116 interconnected by one or more networks, represented by communications network 102. System 100 may be configured as shown in FIG. 1 or in any other suitable configuration as would be appreciated by one of ordinary skill in the art upon viewing this disclosure.

The communications network 102 represents communication equipment, including hardware and any appropriate controlling logic, for interconnecting elements and facilitating communication between interconnected elements. The communications network 102 may include local area networks (LANs), metropolitan area networks (MANs), wide area networks (WANs), any other public or private network, local, regional, or global communication network such as the Internet, enterprise intranet, other suitable wired or wireless communication link, or any combination thereof. The communications network 102 may include any combination of gateways, routers, hubs, switches, access points, base stations, and any other hardware, software, or a combination of the preceding that may implement any suitable protocol. The communications network 102 may include other types of networks, including wireless or wired networks.

The communications network 102 is configured to interconnect the switches 104, the endpoint devices 106, the NAS 108, the database 110, the threat management server 112, the wireless LAN controller 114, and the access point 116. The use of the communications network 102 facilitates identifying, blocking, and/or monitoring of undesirable devices regardless of the geographic location or communication protocols employed by network components or devices on the network. While only one communications network 102 has been illustrated, it should be understood that other embodiments may operate using multiple communications networks 102. In addition, other embodiments may employ one or more wired and wireless networks in communications networks 106.

System 100 comprises switches 104a, 104b, 104c, and 104d operably coupled to the communications network 102. The switches 104 represent communication equipment, including hardware and any appropriate controlling logic, for interconnecting and facilitating data communication to and from endpoint devices 106. Examples of switches 104 include, but are not limited to, gateways, call managers, routers, hubs, switches, access points, base stations, cellular towers, radio networks, satellite telephone equipment implementing appropriate protocols for wireless telephony communications. While only a select number of switches 104 have been illustrated, it should be understood that other embodiments may operate using any suitable number of switches 104. In addition, other embodiments may incorporate switches 104 in other wired or wireless networks coupled to the communications network 102 of system 100.

The access point 116 is any network hardware device (and accompanying software) that allows an endpoint device 106 to connect to the communications network 102. An example of the access point 116 includes, but is not limited to, a router. The access point 116 may allow for both wireless connections and wired connections to the communications network 102. For example, an endpoint device 106 may connect wirelessly to the access point 116 or may connect to the access point 116 via a wired connection (e.g. an Ethernet cable). The system 100 may comprise any suitable number of access points 116.

The wireless LAN controller 114 is configured to control and manage the access points 116. For example, the wireless LAN controller 114 may configure the access points 116 to connect to communications network 102. In some embodiments, the wireless LAN controller 114 may screen wireless connection attempts to the communications network 102 and may block attempts that are deemed suspicious or compromised. For example, the wireless LAN controller 114 may maintain a blacklist that identifies endpoint devices 106 that should be blocked from connecting wirelessly to the communications network 102. The wireless LAN controller 114 can connect to the access point 116 and vice versa to allow for end point devices 106 to connect to the communications network 102 via the access point 116 and wireless LAN controller 114. In FIG. 1, the wireless LAN controller 114 is shown operably coupled to a single access point 116. In other examples, the wireless LAN controller 114 may be configured to manage and control any number of access points 116 of system 100.

System 100 comprises endpoint devices 106a, 106b, 106c, 106d, and 106e operably coupled to the communications network 102 through switches 104. The endpoint devices 106 represent any suitable hardware, including appropriate controlling logic and data, capable of connecting to and communicating data over a network. For example, endpoint devices 106 may include wired or wireless devices including, but not limited to, workstations, laptops or notebook computer systems, printers, Voice over Internet Protocol (VoIP) telephones, Internet Protocol (IP) phones, mobile telephones, advanced phones (e.g. smartphones), personal digital assistants (PDAs), wireless handsets, notebook computer systems, tablet computer systems, embedded devices, network sniffers, auxiliary devices, or the like. The endpoint devices 106 may be capable of transmitting and receiving any forms of media including, but not limited to, audio, video, images, text messages, and other data formats, and documents and accessing disparate network-based services.

The NAS 108 represents any appropriate combination of hardware, controlling logic, and data that facilitates user authentication, admission control and logging, policy enforcement, auditing, and security associated with the communications network 102. In some embodiments, the NAS 108 may represent a networked server or collection of networked servers. The NAS 108 may be directly or indirectly coupled to other systems such as the database 110 to store and retrieve information related to network access control and authentication. In one embodiment, the NAS 108 is configured to track attempted and actual connections by endpoint devices 106 to the communications network 102 using switches 104. For example, the NAS 108 may monitor and track the MAC address and/or IP address associated with endpoint devices 106 on communications network 102 and the IP address and/or port of the switch 104 coupled to those endpoint devices 106.

The NAS 108 is configured to authenticate endpoint devices 106 that are connected to a port of a switch 104. The NAS 108 may authenticate endpoint device 106 using an 802.1X protocol, a MAC authentication Bypass (MAB) whitelist, or any other suitable protocol. For example, the NAS 108 may be configured to determine whether the MAC address of an endpoint device 106 is present in a MAB whitelist. The NAS 108 may authenticate the endpoint device 106 when the endpoint device 106 is present in the MAB whitelist. The NAS 108 may also be configured to automatically fail authentication for endpoint devices 106 that are present in a blacklist. In one embodiment, the NAS 108 is configured to send a device identifier identifying an endpoint device 106 in response to the endpoint device 106 connecting to the switch 104. In another embodiment, the NAS 108 is configured to send a device identifier identifying an endpoint device 106 in response to the endpoint device 106 in response to the endpoint device 106 failing authentication.

In certain implementations, the NAS 108 may log appropriate information about each network access attempt by endpoint devices 106 by communicating with database 110 and/or the threat management server 112. For example, the NAS 108 may log information about endpoint devices 106 that pass or fail authentication in a device log file. Additional information about a device log file is described in FIG. 2. In one embodiment, the functionality of the NAS 108 may be provided by a third-party data server. In particular embodiments, the activity recorded at the NAS 108 may be accessed by a log server (not shown) and utilized as an intermediate data repository.

The database 110 comprises suitable hardware and software, including memory and control logic, for storing, accessing, retrieving, and communicating various types of information, for example, network activity data. The database 110 may include any suitable combination of volatile or non-volatile, local or remote devices suitable for storing and maintaining information. For example, the database 110 may include random access memory (RAM), read only memory (ROM), solid state storage devices, magnetic storage devices, optical storage devices, or any other suitable information storage device or a combination of such devices. In one embodiment, the database 110 represents a relational database for storing connection logs and network activity logs of endpoints 106 in a retrievable manner. The database 110 may represent a database service provided by a third-party. In one embodiment, the database 110 may represent a database for storing all connection details related to endpoint devices 106. For example, the database 110 may maintain network activity information such as IP addresses/MAC addresses associated with endpoint devices 106 and IP addresses of switches 104 coupled to particular endpoint devices 106. The database 110 may also maintain port information (e.g. port addresses) for switches 104 or endpoint devices 106. The database 110 may be directly or indirectly coupled to other systems such as the NAS 108 and be capable of storing and retrieving information related to network access based on instructions from the NAS 108. In particular embodiments, the storage and functionality of database 110 may be provided by a third party data server. In some embodiments, the database 110 may reside on an network authentication server, such as the NAS 108.

The threat management server 112 represents any appropriate combination of hardware, controlling logic, and data for facilitating blocking endpoint devices 106, active monitoring of endpoint devices 106, and/or reconnecting blocked endpoint devices 106. For example, the threat management server 112 may represent a networked server or collection of networked servers capable of communicating with other elements of the system 100 to monitor and prevent access to the network based on appropriate control logic. Additional information about the threat management server 112 is described in FIG. 2.

In particular embodiments, the threat management server 112 may comprise suitable memory to store lists of trusted and untrusted devices. For example, the threat management server 112 may maintain one or more whitelists that identify endpoint devices 106 which are known to be trustworthy. In addition, the threat management server 112 may maintain one or more blacklists that identify endpoint devices 106 which are known to be untrustworthy. In particular embodiments, the blacklists maintained by the threat management server 112 may include endpoint devices 106 that have previously been disconnected from the communications network 102. Additional information about whitelists and blacklists are described in FIG. 2.

In FIG. 1, the threat management server 112 is operably coupled to the communications network 102 to facilitate communication with other elements of the system 100. For example, the threat management server 112 may retrieve information from the NAS 108, the database 110, and/or switches 104 to prevent allowing network access to undesired endpoint devices 106. In particular embodiments, the functionality of the threat management server 112 may be provided by a third party data server. In some embodiments, the threat management server 112 may reside on another data server or its functionality may be provided by another data server, such as the NAS 108.

In one embodiment, using an appropriate user interface, the threat management server 112 may be accessed to initiate identifying, blocking, and/or isolating an endpoint device 106. As an example, the user interface may be an interface accessible through a web browser or an application on an endpoint device 106. In one embodiments, the threat management server 112 may access the NAS 108 and/or the database 110 to determine the IP address of the switch 104 coupled to the endpoint device 106 using its MAC address. In another embodiment, the threat management server 112 may transform the MAC/IP address of an endpoint device 106 into an IP address of the switch 104 coupled to the endpoint device 106. For example, the threat management server 112 may use a mapping function that transforms the MAC/IP address of the endpoint device 106 to the IP address of the switch 104 connected to the endpoint device 106. The threat management server 112 may employ any suitable mapping function or technique as would be appreciated by one of ordinary skill in the art. In other embodiments, the threat management server 112 may use any other technique to determine the IP address of the switch 104 connected to an endpoint device 106.

The threat management server 112 may use the IP address of the switch 104 to access the switch 104 to obtain information about the switch 104, for example port information and available features of the switch, and to issue commands to block the endpoint device 106, either logically or physically, from accessing the communications network 102. The threat management server 112 is configured to send one or more commands to logically and/or physically block or isolate the endpoint device 106 from the communications network 102.

In one embodiment, logically disabling or blocking an endpoint device 106 may involve blackholing the endpoint device 106. Blackholing refers to discarding or dropping frames associated with communications from a particular endpoint device 106. For example, the threat management server 112 sends a blackhole command identifying the endpoint device 106 to the switch 104. The blackhole command may comprise the device identifier for the endpoint device 106. The switch 104 is configured to transform the destination traffic associated with the endpoint device 106 to a null destination in response to receiving the blackhole command. In another embodiment, the switch 104 is configured to discard traffic associated with the endpoint device 106 in response to receiving the blackhole command.

In another embodiment, disabling or blocking an endpoint device 106 may involve physically disconnecting an endpoint device 106 from the communications network 102. For example, the threat management server 112 is configured to send one or more disable commands that triggers a switch 104 to shut off electrical power to the port of the switch 104 that is connected to the endpoint device 106. In one embodiment, this process involves transforming the port from an active (e.g. ON) state to an inactive (e.g. OFF) state. Depending on the network architecture and the type of other endpoint devices 106 that are connected to the same port on the switch 104, physically disconnecting the port may be a viable option to disconnect an undesirable endpoint device 106 from accessing the communications network 102.

In another embodiment, logically disabling or blocking an endpoint device 106 may involve rerouting data traffic associated with the endpoint device 106 to a safe zone. A safe zone refers to a network location that is deemed to be safe to receive traffic from an untrusted device. For example, a safe zone may represent an empty port or a port on a switch 104 that is connected to devices with acceptable levels of risk, such as a VoIP phone, a printer, or a display. Rerouting traffic associated with an endpoint device 106 to a safe zone mitigates the impact of malicious activity. In one embodiment, a safe zone may also be a network traffic monitoring server that enables live monitoring, recording, and/or forensic analysis of data traffic associated with an endpoint device 106. In one embodiment, the threat management server 112 sends a reroute command identifying the endpoint device 106 to the switch 104. For example, the reroute command may comprise the device identifier for the endpoint device 106. The switch 104 is configured to transform the destination of traffic associated with the endpoint device 106 to a safe zone in response to receiving the reroute command. Transferring the traffic associated with the endpoint device 106 to the safe zone allows the endpoint device 106 to be monitored and recorded in a low-risk environment without jeopardizing the system 100 and communications network 102.

The threat management server 112 is configured to reconnect endpoint devices 106 that have been previously blocked from the communications network 102 after the endpoint devices 106 pass authentication. The threat management server 112 allows an endpoint device 106 to send and receive data from a port on a switch 104 after the endpoint device 106 has previously been blocked from one or more ports on the switch 104. The threat management server 112 uses an endpoint device's 106 ability to authenticate itself to determine whether or not to reconnect the endpoint device 106 to the communications network 102. Malicious or untrusted endpoint devices 106 are unable to pass authentication once they have been blocked from the communications network 102 and will remained blocked from the communications network 102. An endpoint device 160 that is blocked from the communications network 102 due to an issue (e.g. hardware or configuration issue) will be able to reconnect to the communications network 102 once the issue is resolved and the endpoint device 106 is able to authenticate itself. Examples of the threat management server 112 reconnecting an endpoint device 106 to the communications network 102 are described in FIGS. 3 and 4.

In one embodiment, the threat management server 112 is configured to send one or more commands that triggers a switch 104 to reduce or limit the bandwidth or throughput of the port an endpoint device 106 is connected to. Reducing the bandwidth or throughput of the port the endpoint device 106 is connected to allows the endpoint device 106 to stay engaged with the communications network 102 in a safe manner which allows information to be collected about the endpoint device 106 and its activities. For example, the threat management server 112 may send a command to a switch 104 to reduce the bandwidth of the port connected to an endpoint device 106 and to reroute traffic associated with the endpoint device 106 to a safe zone for recording and/or forensic analysis. In this example, the endpoint device 106 has limited bandwidth which mitigates the impact of any malicious activities performed by the endpoint device 106 while data is collected about the endpoint device 106.

Figure 2:
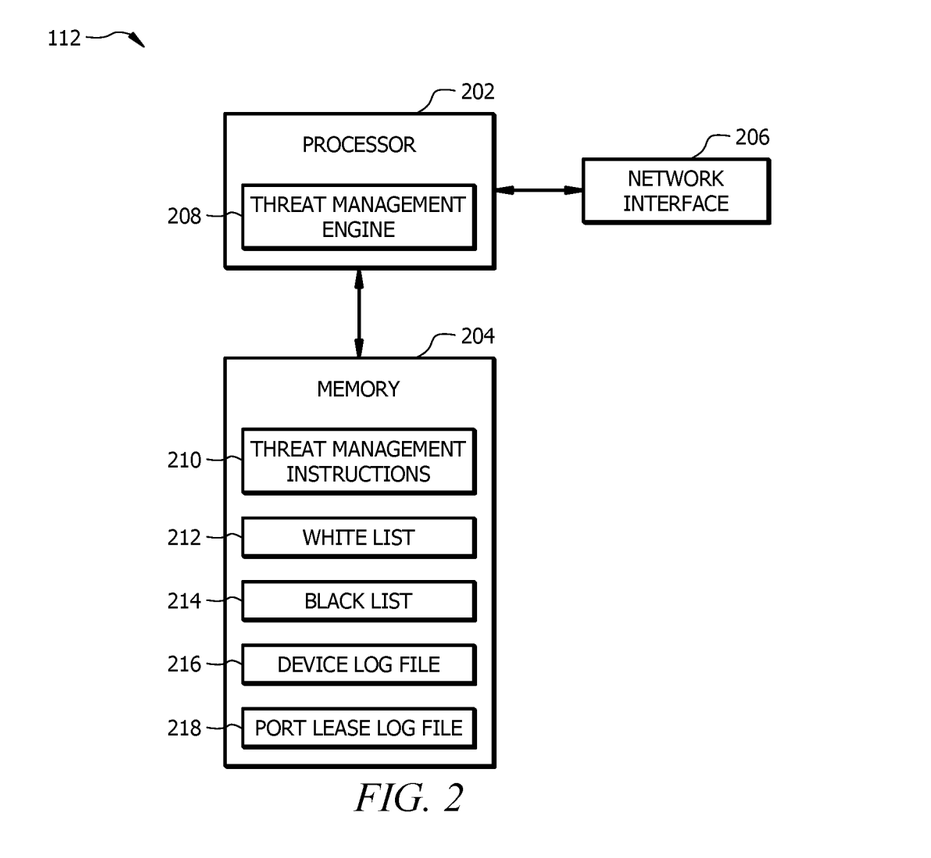
FIG. 2 is a schematic diagram of an embodiment of a threat management server.

FIG. 2 is a schematic diagram of an embodiment of a threat management server 112. The threat management server 112 comprises a processor 202, a memory 204, and a network interface 206. The threat management server 112 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a threat management engine 208. In an embodiment, the threat management engine 208 is implemented using logic units, FPGAs, ASICs, DSPs, or any other suitable hardware. The threat management engine 208 is configured to implement a specific set of rules or process that provides an improved technological result.

In one embodiment, the threat management engine 208 is configured to determine an undesirable endpoint device 106 is connected to a port of a switch 104 and to block the endpoint device 106 from accessing the communications network 102. In this example, the threat management engine 208 prevents undesirable devices from reconnecting to the communications network 102 which reduces the vulnerability of the system 100 to malicious activity performed by the undesirable device and provides improved network security.

In one embodiment, the threat management engine 208 is configured to set a block timeout period when an endpoint device 106 is blocked from a port on a switch 104. For example, the threat management engine 208 may add or set a block timeout period for an endpoint device 106 in a black list 214 in response to the endpoint device 106 being blocked from a port on a switch 104. A block timeout period may be set for 10 minutes, 15 minutes, 30 minutes, 1 hour, 6 hours, 24 hours, or any other suitable amount of time or time period. In one embodiment, the block timeout period may be linked with a device identifier for the endpoint device 106 and a port identifier for the port. The block timeout period indicates an amount of time the endpoint device 106 is blocked from the port on the switch 104. In one embodiment, the threat management engine 208 may set the block timeout period based on the number of times an endpoint device 106 has been blocked from a port and/or a switch 104. For example, the block timeout period may increase each time an endpoint device 106 is blocked from a port and/or switch 104.

In another embodiment, the threat management engine 208 is configured to determine an undesirable endpoint device 106 that has previously been blocked from the communications network 102 is connected to a port of a switch 104 and to block the endpoint device 106 from accessing the communications network 102. In this example, the threat management engine 208 detects undesirable devices that have been previously blocked and prevents them from reconnecting to the communications network 102.

In another embodiment, the threat management engine 208 is configured to determine an undesirable endpoint device 106 that has previously been blocked on a port of a switch 104 is connected to a different port of the switch 104 and to block the endpoint device 106 from accessing the communications network 102. In this example, the threat management engine 208 detects undesirable devices that have been previously blocked from one or more ports on a switch 104 and prevents them from reconnecting to the communications network 102 using a different port on the switch 104. For example, a bad actor may try to connect a malicious device to different ports of the switch 104 after the device has been blocked from one or more other ports of the switch 104.

In another embodiment, the threat management engine 208 is configured to determine an undesirable endpoint device 106 is connected to a port on a switch 104 and to isolate the endpoint device 106 within a safe zone to allow the device to be monitored and tracked. In this example, the threat management engine 208 reduces or limits the bandwidth of the port on the switch 104, collects information about the undesirable device, and/or monitors the traffic associated with the undesirable device.

The threat management engine 208 is configured to reconnect endpoint devices 106 that have been previously blocked from one or more ports on a switch 104 after the endpoint devices 106 pass authentication with the NAS 108. The threat management engine 208 uses an endpoint device's 106 ability to authenticate itself to determine whether or not to reconnect the endpoint device 106. This process allows the threat management engine 208 to reconnect endpoint devices 106 to the communications network 102 while prevent malicious or untrusted endpoint devices 106 from reconnecting to the communications network 102. Examples of the threat management engine 208 reconnecting endpoint devices 106 to the communications network 102 are described in FIGS. 3 and 4.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise ROM, RAM, ternary content-addressable memory (TCAM), dynamic random-access memory (DRAM), and static random-access memory (SRAM). The memory 204 is operable to store threat management instructions 210, a whitelist 212, a blacklist 214, a device log file 216, a port lease log file 218, and/or any other data or instructions. The threat management instructions 210 comprise any suitable set of instructions, logic, rules, or code operable to execute the threat management engine 208.

The whitelist 212 identifies endpoint devices 106 which are known to be trustworthy and are allowed to access the communications network 102. The whitelist 121 may comprise information including, but not limited to, endpoint device identifiers, MAC addresses, IP addresses, switch identifiers, switch port addresses, time stamps, any other suitable type of information, and/or combinations thereof. An example of a whitelist 212 includes, but is not limited to, a MAB whitelist. In one embodiment, the system 100 (e.g. the NAS 108) is configured to automatically authenticate an endpoint device 106 that is present on the whitelist 212.

The blacklist 214 identifies endpoint devices 106 which are known to be untrustworthy and are prohibited from accessing the communications network 102. The blacklist 214 may comprise information including, but not limited to, endpoint device identifiers, MAC addresses, IP addresses, switch identifiers, switch port addresses, time stamps, any other suitable type of information, and/or combinations thereof. For example, the blacklist 214 may identify endpoint devices 106 blocked from accessing the communications network 102. The blacklist 214 may also identify ports on a switch 104 that an endpoint device 106 has been blocked from. In one embodiment, the system 100 (e.g. the NAS 108) is configured to automatically fail authentication for an endpoint device 106 that is present on the blacklist 214.

In one embodiment, the black list 214 identifies block timeout periods linked with device identifiers for endpoint device 106 that have been block from one or more ports on a switch 104. A block timeout period may indicate an amount of time an endpoint device 106 is blocked from a port and/or the switch 104. For example, a block timeout period may identify a time when the block timeout period expires. As another example, a block timeout period may identify an amount of time remaining until the block timeout period expires. In other examples, the block timeout period may use any other technique for indicating how long an endpoint device 106 is blocked from a port on the switch 104.

The device log file 216 identifies endpoint devices 106 that have either passed or failed authentication with the NAS 108. The device log file 216 may comprise information including, but not limited to, endpoint device identifiers, MAC addresses, IP addresses, switch port addresses, time stamps, any other suitable type of information, and/or combinations thereof. In one embodiment, an endpoint device identifier may be used with the device log file 216 to look-up and determine whether an endpoint device 106 linked with the device identifier has previously been authenticated or has previously failed authentication with the NAS 108.

The port lease log file 218 identifies endpoint devices 106 with a lease on a port of a switch 104. A port lease allows access to the communications network 102 via a particular port of a switch 104 for some period of time. A port lease may be set for thirty minutes, one hour, six hours, twenty four hours, or any other suitable period of time. The port lease log file 218 may comprise information including, but not limited to, endpoint device identifiers, MAC addresses, IP addresses, switch identifiers, switch port addresses, port lease periods, time stamps, any other suitable type of information, and/or combinations thereof. For example, an endpoint device identifier may be used with the port lease log file 218 may be used to look-up and determine whether an endpoint device 106 linked with the identifier has an active port lease. The port lease log file 218 may also identify the switch 104 and the port where the port lease is active.

The network interface 206 is configured to enable wired and/or wireless communications. The network interface 206 is configured to communicate data through the system 100, the communications network 102, and/or any other system or domain. For example, the network interface 206 may be configured for communication with a modem, a switch, a router, a bridge, a server, or a client. The processor 202 is configured to send and receive data using the network interface 206 from the communications network 102.

Figure 3:
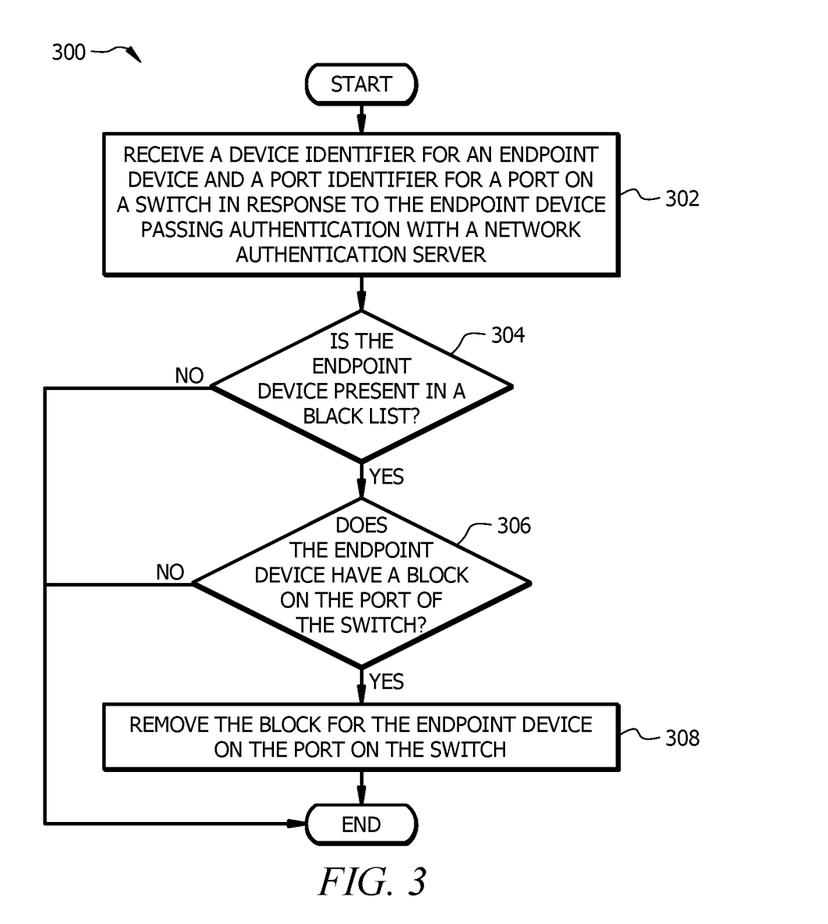
FIG. 3 is a flowchart of an embodiment of a device reconnection method.

FIG. 3 is a flowchart of an embodiment of a device reconnection method 300. Method 300 is implemented by the threat management server 112 to allow endpoint devices 106 to reconnect to the communications network 102 after being previously blocked from accessing the communications network 102.

Reconnecting endpoint devices 106 to the communications network 102 poses several technical challenges. For instance, a bad actor may try to reconnect a malicious endpoint device 106 to a port on a switch 104 to reconnect the malicious endpoint device 106 after it has previously been blocked from accessing the communications network 102. Conventional systems are unable to distinguish between a malicious endpoint device 106 and a trusted endpoint device 106 attempting to reconnect to the communications network 102. Conventional systems can only be configured to either allow malicious endpoint devices 106 to reconnected to the communications network 102 or prevent all endpoint devices 106 from reconnecting to the communications network 102. In contrast, the threat management server 112 provides the ability to identify and reconnect trusted endpoint devices 106 to the communications network 102 while preventing untrusted endpoint device 106 from reconnecting to the communications network 102.

A non-limiting example is provided to illustrate how the threat management engine 208 implements method 300 to reconnect an endpoint device 106 to the communications network 102. As an example, an endpoint device 106 may be blocked from accessing the communications network 102 while issues with the endpoint device 106 are resolved. When an endpoint device 106 has a hardware or configuration issue, the endpoint device 106 may be unable to authenticate itself. The endpoint device 106 may be blocked from accessing the communications network 102 via one or more ports on a switch 104. A blocked endpoint device 106 is unable to communicate with the communications network 102, but is able to authenticate itself. Once issues with the endpoint device 106 have been resolved, the endpoint device 106 may authenticate itself to reconnect to the communications network 102.

In one embodiment, the endpoint device 106 may send a message comprising device information to the NAS 108 to initiate authenticating the endpoint device 106. For example, the device information may comprise a MAC address of the endpoint device 106, an IP address of the endpoint device 106, and/or any other suitable information. The NAS 108 authenticates the endpoint device 106 based at least in part on the device information for the endpoint device 106. In one embodiment, authenticating the endpoint device 106 is not based on information linked with a user. In other words, the NAS 108 does not use user information such as log-in credential to authenticate the endpoint device 106. In some instances, the NAS 108 may fail authentication for the endpoint device 106 if endpoint device 106 attempts to authenticate itself using user information. This process allows the NAS 108 to specify and control what protocol and/or techniques may be used to authenticate endpoint devices 106. In other examples, the NAS 108 may authenticate the endpoint device 106 using any other suitable protocols.

In another embodiment, the endpoint device 106 may be added to a white list 212 which allows the endpoint device 106 to pass authentication with the NAS 108. The NAS 108 may authenticate the endpoint device 106 in response to identifying the endpoint device 106 in a white list 212. The NAS 108 sends a device identifier for the endpoint device 106 and a port identifier for the port on the switch 104 the endpoint device 106 is connected to in response to authenticating the endpoint device 106.

At step 302, the threat management server 112 receives the device identifier for the endpoint device 106 and the port identifier for the port in response to the endpoint device 106 passing authentication with the NAS 108. In one embodiment, the NAS 108 collects information from the switch 104 about the endpoint device 106 to generate a device identifier for the endpoint device 106. Examples of device identifiers may include, but are not limited to, a MAC address of the endpoint device 106, an IP address of the endpoint device 106, a device type, a vendor, any other suitable information, or combinations thereof. An example of a port identifier includes, but is not limited to, a port address (e.g. IP address) for the port on the switch. For example, the device identifier for the endpoint device 106 may comprise the MAC address for the endpoint device 106 and the port identifier may comprise the IP address of the port on the switch 104. In another embodiment, the threat management server 112 may request information about the endpoint device 106 and/or the port from the NAS 108 and/or the database 110.

At step 304, the threat management server 112 determines whether the endpoint device 106 is present in a black list 214. For example, the threat management server 112 may use the device identifier (e.g. MAC address) to look-up whether the endpoint device 106 is present in the black list 214. The presence of the endpoint device 106 in the black list 214 indicates that historical information about whether the endpoint device 106 has previously been blocked from accessing the network is available. The threat management server 112 proceeds to step 306 when the threat management server 112 determines that the endpoint device 106 is present in the black list 214. The absence of the endpoint device 106 in the black list 214 indicates that historical information about whether the endpoint device 106 has previously been blocked from accessing the network may not be available. The threat management server 112 terminates method 300 when the threat management server 112 determines that the endpoint device 106 is not present in the black list 214.

At step 306, the threat management server 112 determines whether the endpoint device 106 currently has a block on the port of the switch 104. For example, the threat management server 112 may use the port identifier (e.g. IP address) to look-up whether the endpoint device 106 has a block on the port linked with the port identifier. The threat management server 112 proceeds to step 308 when the threat management server 112 determines the endpoint device 106 currently has a block on the port of the switch 104. Otherwise, the threat management server 112 terminates method 300.

At step 308, the threat management server 112 removes the block for the endpoint device 106 on the port of the switch 104. In one embodiment, removing the block comprises removing the endpoint device 106 from a black list 214. In another embodiment, the threat management server 112 sends a command to the switch 104 to remove the block on the port of the switch 104. The command triggers the switch 104 to allow traffic to be communicated between the endpoint device 106 and the communications network 102. In one embodiment, the command triggers the switch 104 to activate the port the endpoint device 106 is connected to. As an example, the switch 104 may logically activate the port by configuring the port to enable communications. As another example, the switch 104 may physically activate the port by providing electrical power to the port. In other example, the threat management server 112 removes the block for the endpoint device 106 on the port of the switch 104 using any other suitable technique.

In one embodiment, the threat management server 112 removes the endpoint device 106 from the black list 214 in response to removing the block for the endpoint device 106. For example, the threat management server 112 may determine that the endpoint device 106 no longer has blocks on any other ports of the switch once the block is removed and may subsequently remove the endpoint device 106 from the black list 214.

In one embodiment, the threat management server 112 adds the endpoint device 106 to a white list 212 in response to removing the block for the endpoint device 106. For example, the threat management server 112 adds the endpoint device 106 to a white list 212 once the endpoint device 106 has been removed from the black list 214.

Figure 4:
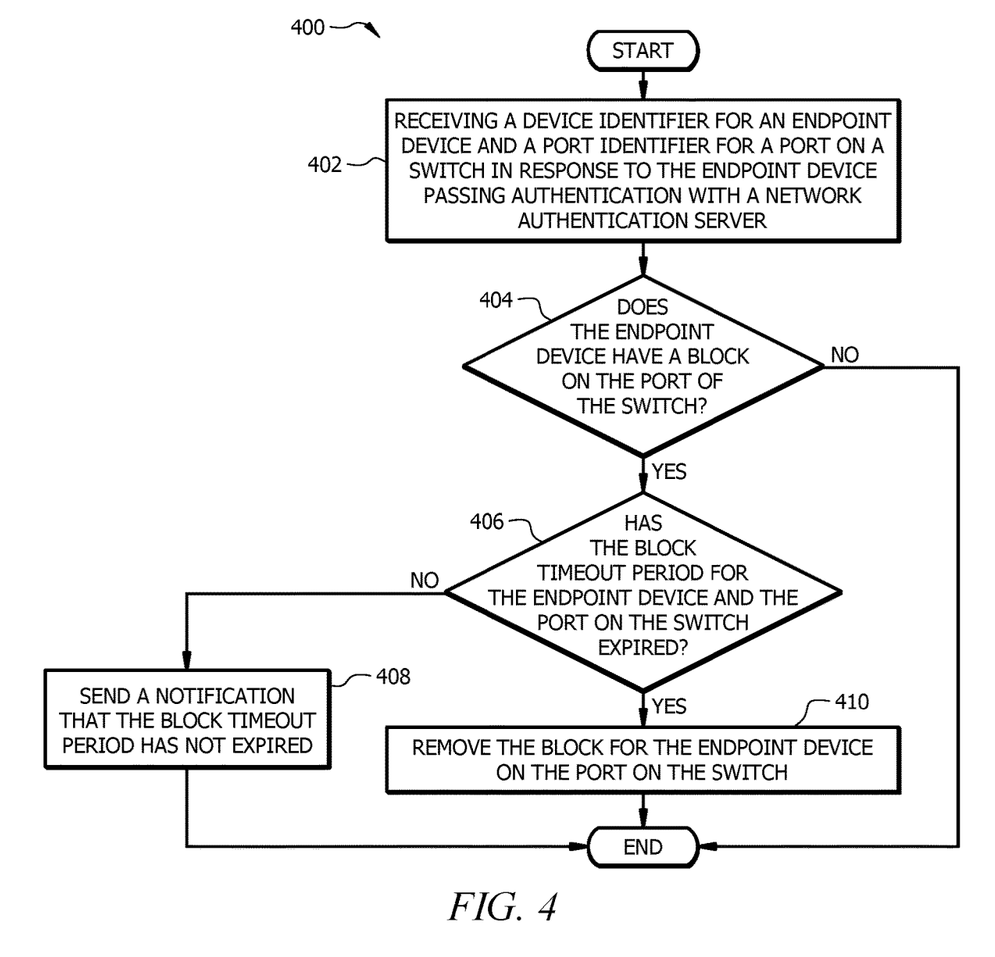
FIG. 4 is a flowchart of another embodiment of a device reconnection method.

FIG. 4 is a flowchart of another embodiment of a device reconnection method 400. Method 400 is implemented by the threat management server 112 to allow endpoint devices 106 to reconnect to the communications network 102 after being previously blocked from accessing the communications network 102.

Similar to the example described in FIG. 3, conventional systems are unable to distinguish between a malicious endpoint device 106 and a trusted endpoint device 106 attempting to reconnect to the communications network 102. The threat management server 112 provides the ability to identify and reconnect trusted endpoint devices 106 to the communications network 102 while preventing untrusted endpoint devices 106 from reconnecting to the communications network 102.

A non-limiting example is provided to illustrate how the threat management engine 208 implements method 400 to reconnect an endpoint device 106 to the communications network 102. As an example, an endpoint device 106 may be blocked from accessing the communications network 102 while issues with the endpoint device 106 are resolved. The endpoint device 106 may be blocked from accessing the communications network 102 via one or more ports on a switch 104. Once issues with the endpoint device 106 have been resolved, the endpoint device 106 may authenticate itself to reconnect to the communications network 102.

In one embodiment, the endpoint device 106 may send a message comprising device information to the NAS 108 to initiate authenticating the endpoint device 106. For example, the device information may comprise a MAC address of the endpoint device 106, an IP address of the endpoint device 106, and/or any other suitable information. The NAS 108 authenticates the endpoint device 106 based at least in part on the device information for the endpoint device 106. In one embodiment, authenticating the endpoint device 106 is not based on information linked with a user and the NAS 108 may fail authentication for the endpoint device 106 if endpoint device 106 attempts to authenticate itself using user information. In other examples, the NAS 108 may authenticate the endpoint device 106 using any other suitable protocols.

In another embodiment, the endpoint device 106 may be added to a white list 212 which allows the endpoint device 106 to pass authentication with the NAS 108. The NAS 108 may authenticate the endpoint device 106 in response to identifying the endpoint device 106 in a white list 212. The NAS 108 sends a device identifier for the endpoint device 106 and a port identifier for the port on the switch 104 the endpoint device 106 is connected to in response to authenticating the endpoint device 106.

At step 402, the threat management server 112 receives a device identifier for the endpoint device 106 and a port identifier for the port in response to the endpoint device 106 passing authentication with the NAS 108. In one embodiment, the NAS 108 collects information from the switch 104 about the endpoint device 106 to generate a device identifier for the endpoint device 106. Examples of device identifiers may include, but are not limited to, a MAC address of the endpoint device 106, an IP address of the endpoint device 106, a device type, a vendor, any other suitable information, or combinations thereof. An example of a port identifier includes, but is not limited to, a port address for the switch. The NAS 108 sends the device identifier and the port identifier to the threat management server 112. For example, the device identifier for the endpoint device 106 may comprise the MAC address for the endpoint device 106 and the port identifier may comprise the IP address of the port on the switch 104. In another embodiment, the threat management server 112 may request information about the endpoint device 106 and/or the port from the NAS 108 and/or the database 110.

At step 404, the threat management server 112 determines whether the endpoint device 106 currently has a block on the port of the switch 104. For example, the threat management server 112 may use the port identifier (e.g. IP address) to look-up whether the endpoint device 106 has a block on the port linked with the port identifier. The threat management server 112 proceeds to step 406 when the threat management server 112 determines the endpoint device 106 currently has a block on the port of the switch 104. Otherwise, the threat management server 112 terminates method 400.

At step 406, the threat management server 112 determines whether the block timeout period for the endpoint device 106 and the port has expired. For example, the block timeout period may identify a time when the block timeout period expires. The threat management server 112 determines whether the current time is later than the time when the block timeout period expires. As another example, the threat management server 112 may set a timer linked with an endpoint device 106 and port when the endpoint device 106 is blocked from the port. The timer is set to the block timeout period which may be any suitable amount of time. The threat management server 112 determines whether the timer has expired. In other examples, the threat management server 112 may use any other suitable technique for determining whether the block timeout period for the endpoint device 106 and the port has expired.

In one embodiment, the threat management server 112 may set the block timeout period based on the number of times an endpoint device 106 has been blocked from a port and/or a switch 104. The block timeout period may increase each time an endpoint device 106 is blocked from a port and/or switch 104. For example, the block timeout period may be set to block the endpoint device 106 from connecting to a port for 15 minutes the first time the endpoint device 106 is blocked from the port. The block timeout period may be increased to block the endpoint device 106 from connecting to the port for 30 minutes the next time the endpoint device 106 is blocked from the port, and so on.

The threat management server 112 proceeds to step 410 when the threat management server 112 determines that the block timeout period has expired. Otherwise, the threat management server 112 proceeds to step 408 when the threat management server 112 determines that the block timeout period has not expired.

At step 408, the threat management server 112 sends a notification that the block timeout period has not expired. For example, the threat management server 112 may send an email or trigger a pop-up message that indicates that the block timeout period has not expired on the port for the endpoint device 106 and that the endpoint device 106 cannot be reconnected to the communications network 102 as this time. The notification may comprise any other suitable information. For example, the notification may indicate the time when the endpoint device 106 is able to reconnect to the port and the communications network 102.

Returning to step 406, the threat management server 112 proceeds to step 410 when the threat management server 112 determines that the block timeout period has expired. At step 410, the threat management server 112 removes the block for the endpoint device 106 on the port of the switch 104. In one embodiment, removing the block comprises removing the endpoint device 106 from a black list 214. In another embodiment, the threat management server 112 sends a command to the switch 104 to remove the block on the port of the switch 104. The command triggers the switch 104 to allow traffic to be communicated between the endpoint device 106 and the communications network 102. In one embodiment, the command triggers the switch 104 to activate the port the endpoint device 106 is connected to. As an example, the switch 104 may logically activate the port by configuring the port to enable communications. As another example, the switch 104 may physically activate the port by providing electrical power to the port. In other example, the threat management server 112 removes the block for the endpoint device 106 on the port of the switch 104 using any other suitable technique.

In one embodiment, the threat management server 112 removes the endpoint device 106 from the black list 214 in response to removing the block for the endpoint device 106. For example, the threat management server 112 may determine that the endpoint device 106 no longer has blocks on any other ports of the switch once the block is removed and may subsequently remove the endpoint device 106 from the black list 214.

In one embodiment, the threat management server 112 adds the endpoint device 106 to a white list 212 in response to removing the block for the endpoint device 106. For example, the threat management server 112 adds the endpoint device 106 to a white list 212 once the endpoint device 106 has been removed from the black list 214.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
 a switch configured to provide network connectivity for one or more endpoint devices to a network;
 a network authentication server operably coupled to the switch and configured to:
  receive device information from an endpoint device connected to a port on the switch;
  authenticate the endpoint device based at least in part on the device information;
  send a device identifier for the endpoint device and a port identifier identifying the port on the switch to a threat management server in response to authenticating the endpoint device; and
 the threat management server operably coupled to the switch and the network authentication server, comprising:

a memory configured to store:
  a black list identifying:
    one or more endpoint devices blocked from accessing the network; and
    ports on the switch each of the one or more endpoint devices have been blocked from; and
  a threat management engine implemented by a processor configured to:
    receive the device identifier and the port identifier in response to the endpoint device passing authentication with the network authentication server;
    determine the endpoint device is present in the black list using the device identifier in response to receiving the device identifier, wherein the endpoint device is blocked from accessing the network in response to previously failing to authenticate with the network authentication server;
    determine the endpoint device has a block on the port of the switch using the port identifier in response to determining the endpoint device is present in the black list; and
    remove the block for the endpoint device on the port on the switch in response to determining the endpoint device has passed authentication with the network authentication server.

2. The system of claim 1, wherein authenticating the endpoint device is in response to identifying the endpoint device in a whitelist identifying devices allowed to access the network.

3. The system of claim 1, wherein authenticating the endpoint device is not based on information linked with a user.

4. The system of claim 1, wherein the endpoint device sends a message comprising the device information to the network authentication server to initiate authenticating the endpoint device.

5. The system of claim 1, wherein removing the block for the endpoint device comprises removing the endpoint device from the black list.

6. The system of claim 1, wherein the threat management engine is configured to add the endpoint device to a white list in response to removing the block for the endpoint device.

7. The system of claim 1, wherein:
  removing the block for the endpoint device comprises sending a command to the switch; and
  the command triggers the switch to activate the port the endpoint device is connected to in response to receiving the command.

8. A threat management server, comprising:
  a memory configured to store:
    a black list identifying:
      one or more endpoint devices blocked from accessing a network; and
      ports on a switch each of the one or more endpoint devices have been blocked from; and
  a threat management engine implemented by a processor configured to:
    receive a device identifier for an endpoint device and a port identifier identifying a port on the switch in response to a network authentication server authenticating the endpoint device based at least in part on device information received from the endpoint device;
    determine the endpoint device is present in the black list using the device identifier in response to receiving the device identifier, wherein the endpoint device is blocked from assessing the network in response to previously failing to authenticate with the network authentication server;
    determine the endpoint device has a block on the port of the switch using the port identifier in response to determining the endpoint device is present in the black list; and
    remove the block for the endpoint device on the port on the switch in response to determining the endpoint device has passed authentication with the network authentication server.

9. The device of claim 8, wherein receiving the device identifier for the endpoint device is in response to the network authentication server identifying the endpoint device on a whitelist identifying endpoint devices allowed to access the network.

10. The device of claim 8, wherein authenticating the endpoint device is not based on information linked with a user.

11. The device of claim 8, wherein the endpoint device sends a message comprising the device information to the network authentication server to initiate authenticating the endpoint device.

12. The device of claim 8, wherein removing the block for the endpoint device comprises removing the endpoint device from the black list.

13. The device of claim 8, wherein the threat management engine is configured to add the endpoint device to a white list in response to removing the block for the endpoint device.

14. The device of claim 8, wherein:
  removing the block for the endpoint device comprises sending a command to the switch; and
  the command triggers the switch to activate the port the endpoint device is connected to in response to receiving the command.

15. A method, comprising:
  receiving, by a network authentication server, device information from an endpoint device connected to a port on a switch;
  authenticating, by the network authentication server, the endpoint device based at least in part on the device information;
  receiving, by a threat management server, a device identifier for an endpoint device and a port identifier for the port on the switch in response to the network authentication server authenticating the endpoint device;
  determining, by the threat management server, the endpoint device is present in a black list using the device identifier in response to receiving the device identifier, wherein the endpoint device is blocked from accessing the network in response to previously failing to authenticate with the network authentication server, and wherein the blacklist identifies:
    one or more endpoint devices blocked from accessing the network; and
    ports on a switch each of the one or more endpoint devices have been blocked from;
  determining, by the threat management server, the endpoint device has a block on the port of the switch using port identifier in response to determining the endpoint device is present in the black list; and
  removing, by the threat management server, the block for the endpoint device on the port on the switch in response to determining the endpoint device has passed authentication with the network server.

16. The method of claim 15, wherein authenticating the endpoint device is in response to identifying the endpoint device in a white list identifying endpoint devices allowed to access the network.

17. The method of claim 15, wherein authenticating the endpoint device is not based on information linked a user.

18. The method of claim 15, wherein the endpoint device sends a message comprising the device information to the network authentication server to initiate authenticating the endpoint device.

19. The method of claim 15, wherein removing the block for the endpoint device comprises removing the endpoint device from the black list.

20. The method of claim 15, wherein:
- removing the block for the endpoint device comprises sending a command to the switch; and
- the command triggers the switch to activate the port the endpoint device is connected to in response to receiving the command.

* * * * *

UNITED STATES PATENT AND TRADEMARK OFFICE
CERTIFICATE OF CORRECTION

PATENT NO. : 10,567,433 B2
APPLICATION NO. : 15/642983
DATED : February 18, 2020
INVENTOR(S) : Rahul Isola et al.

It is certified that error appears in the above-identified patent and that said Letters Patent is hereby corrected as shown below:

In the Claims

In Column 17, Line 11, Claim 1: after, "...network authentication.." please delete "server," and insert --server;--, therefor.

In Column 18, Line 1, Claim 8: after, "...is blocked from..." please delete, "assessing the network" and insert --accessing the network--, therefor.

In Column 18, Line 2, Claim 8: please delete "previously falling" and please insert --previously failing--, therefor.

Signed and Sealed this
Thirty-first Day of May, 2022

*Katherine Kelly Vidal*

Katherine Kelly Vidal
*Director of the United States Patent and Trademark Office*